No. 654,000. Patented July 17, 1900.
L. D. HOWARD.
SULKY ATTACHMENT FOR HARROWS.
(Application filed Apr. 23, 1900.)
(No Model.)
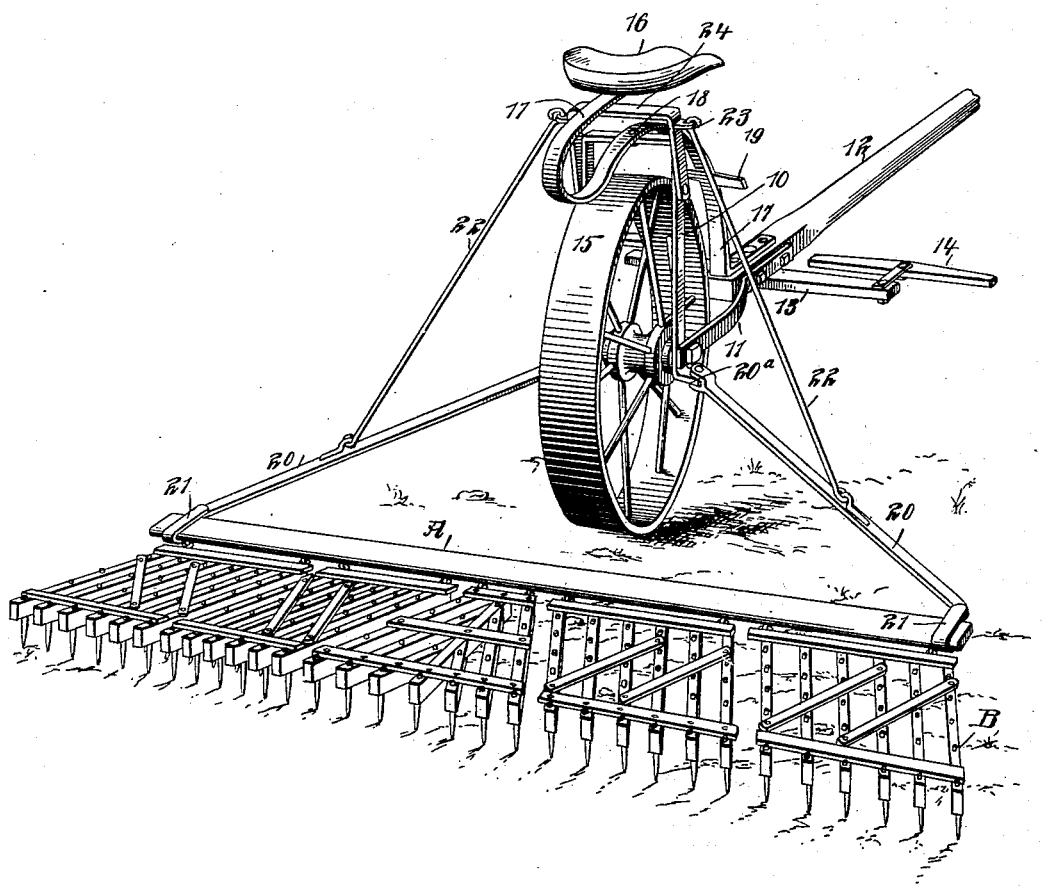
WITNESSES:
INVENTOR
Leon D. Howard.
BY
ATTORNEYS

UNITED STATES PATENT OFFICE.

LEON D. HOWARD, OF MARSTON, SOUTH DAKOTA.

SULKY ATTACHMENT FOR HARROWS.

SPECIFICATION forming part of Letters Patent No. 654,000, dated July 17, 1900.

Application filed April 23, 1900. Serial No. 13,917. (No model.)

*To all whom it may concern:*

Be it known that I, LEON D. HOWARD, a citizen of the United States, and a resident of Marston, in the county of Sully and State of South Dakota, have invented a new and Improved Sulky Attachment for Harrows, of which the following is a full, clear, and exact description.

The purpose of the invention is to provide a sulky attachment for harrows so constructed that the said attachment may be turned from side to side, as occasion may demand, without exerting corresponding influence on the harrow and to so construct the attachment that a single wheel only is needed and so that the driver will be close to the team, rendering it easy to handle the animals, and, furthermore, so that the driver will be out of the dust, the horses being attached by whiffletrees or their equivalents to the tongue or pole.

Another purpose of the invention is to so construct the attachment that it may be applied to any harrow and when applied will cause the harrow to draw much easier than the customary harrow.

The invention consists in the novel construction and combination of the several parts, as will be hereinafter fully set forth, and pointed out in the claims.

Reference is to be had to the accompanying drawing, forming a part of this specification, in which is represented a perspective view of the improved attachment.

A represents the forward or draft beam of a harrow, and B the drag-sections of the harrow, connected with the draft-beam A.

It will be understood that the attachment to be hereinafter described may be applied to any form of harrow.

The frame of the attachment consists of an upright U-hanger 10 and side bars 11, which may be plain or of angle-iron. The side bars extend from the lower portions of the members of the U-hanger to an attachment to a pole or tongue 12, the cross-bar of the U-hanger being its upper portion. The tongue or pole 12 is provided with the usual doubletree; but if a single horse is employed the pole or tongue may be made short or a clevis may be used where the sides 11 come together, so that a singletree may be attached at this point.

A wheel 15, preferably provided with a wide tire, said wheel being of suitable construction and size, is journaled in any suitable manner in the bottom portion of the U-hanger 10. The driver's seat 16 is located over the central portion of the wheel 15 and is attached to a shank 17, which is in the nature of a spring, and is preferably curved rearwardly and then forwardly, being secured to the cross-bar of the U-hanger 10 by a rivet 18 or its equivalent, and the said shank of the seat is then carried downward and attached to the pole or tongue 12. The forward portion of the seat-support is provided with lateral projections 19, which serve as foot-rests for the driver. Horizontal lugs $20^a$ are outwardly and laterally projected from the lower ends of the members of the hanger 10, and the forward ends of connecting-rods 20 are pivotally attached to these lugs, the rear ends of said connecting-bars 20 being pivotally secured to clamps 21, of any suitable or approved construction, which clips are adapted for attachment to the draft-bar A of the harrow at or near the ends of the same.

Braces 22 are pivotally attached to the connecting-bars 20, and these braces extend upward and are pivotally connected with ears 23, which extend from the sides of a yoke 24, which yoke is pivoted to the side portions of the hanger 10, and the yoke is adapted to move under the seat or in a forward direction from beneath the same. This movable yoke permits vertical play of the tongue or pole and also permits the machine to pass over uneven surfaces without interrupting the continuous action of the harrow-teeth. It is evident that the wheel 15 may be turned to the right or to the left to any desired extent without interfering with the position of the harrow in the ground until the harrow is drawn forward, when the wheel is at an angle to the transverse center of the harrow. It is also obvious that the attachment may be made to any harrow, that the attachment is exceedingly light, simple, and durable, and that it will enable the team to do much more work in a more effective manner than when hitched directly to the harrow.

Having thus described my invention, I claim as new and desire to secure by Letters Patent—

1. A sulky attachment for harrows, consisting of a frame, a single supporting-wheel, a pole or tongue connected with the frame, connecting-rods pivotally attached to the frame at its sides, and clamps pivotally attached to the connecting-rods and adapted for attachment to the draft-bar of the machine.

2. A sulky attachment for harrows and the like, consisting of a frame, a single wheel journaled in the said frame, a tongue connected with the frame, a seat supported above the said wheel, and connecting-rods pivotally attached to the lower side portions of the frame, and clamps carried by the said connecting-rods, for the purpose set forth.

3. A sulky attachment for harrows and the like, consisting of a frame, a yoke pivoted to the frame, a seat secured to the frame over the yoke, a wheel journaled in the lower portion of the frame, a pole or tongue connected with the said frame, connecting-rods pivotally attached at one of their ends to the lower side portion of the frame, clamps pivoted to the opposite ends of the connecting-rods, and braces pivotally connecting said connecting-rods with the said pivoted yoke, for the purpose set forth.

In testimony whereof I have signed my name to this specification in the presence of two subscribing witnesses.

LEON D. HOWARD.

Witnesses:
 J. H. GROPENGIESER,
 J. A. GROPENGIESER.